United States Patent [19]
Dalrymple

[11] 3,737,014
[45] June 5, 1973

[54] COUPLING ASSEMBLY
[76] Inventor: William P. Dalrymple, 415 University Drive, Rochester, Mich. 48063
[22] Filed: Sept. 27, 1971
[21] Appl. No.: 183,929

[52] U.S. Cl. ................. 192/30 R, 192/38, 192/72, 192/85 AT, 74/640
[51] Int. Cl. .................. F16d 25/06, F16d 23/00
[58] Field of Search .............. 192/30 R, 38, 72, 192/85 AT; 188/74, 365; 74/63, 190, 640, 804

[56] References Cited
UNITED STATES PATENTS
| 3,435,706 | 4/1969 | Humphreys | 74/640 |
| 2,213,383 | 9/1940 | Canfield | 192/85 AT |
| 2,514,420 | 7/1950 | Shapiro | 74/63 |
| 3,088,333 | 5/1963 | Musser | 74/640 |
| 3,604,287 | 9/1971 | Humphreys | 74/640 |

Primary Examiner—Allan D. Herrmann
Attorney—Gerald E. McGlynn, Jr., Paul J. Reising, Harold W. Milton, Jr. et al.

[57] ABSTRACT

A coupling assembly which may be utilized as a brake, torque convertor or differential. The basic assembly includes a pair of concentric cylindrical members with roller elements disposed therebetween and in rolling engagement with the concentric members. Normally one concentric member may be freely driven or rotated relative to the other, however, the system also includes actuation means for distorting one of the concentric members into an elliptical or other configuration to provide a distortion in the other member which moves therealong in a wave-like fashion, the transmission of energy between the members being proportional to the amount of distortion, i.e., the number or frequency of distortions or the amplitude of a single distortion or various combinations thereof.

15 Claims, 3 Drawing Figures

Patented June 5, 1973

3,737,014

INVENTOR.
William P. Dalrymple
BY
Bernard, McDlynn & Rising
ATTORNEYS

COUPLING ASSEMBLY

The instant invention relates to a coupling assembly which may be utilized as a torque convertor, brake or differential.

There are numerous torque convertor, differential and brake assemblies known in the prior art which utilize two relatively moving members with means disposed between the members to control relative movement between the members by effecting a wedging engagement between the relatively moving members. In such assemblies, some actuation is required to effect the wedging engagement so as to control the relative movement between the two moving members. In such assemblies, the relatively moving members maintain their configuration and the wedging action is achieved by a camming function or the like. Examples of such prior art assemblies are shown in U.S. Pat. Nos. 1,310,967; 2,398,361; 2,514,569 and 2,743,803. The problem with such prior art assemblies is that they rely upon wedging action which in turn creates high frictional loads.

It is an object and feature of this invention to provide a coupling assembly which utilizes a novel concept to control the relative movement between two relatively moving input and output means in the assembly without relying upon high frictional loads and which is highly efficient in that the energy in substantially equals the energy out.

In correlation with the foregoing object and feature, it is another object and feature of this invention to provide a coupling assembly including output means and input means freely movable relative to the output means during a deactuated condition and non-movable relative to the output means during a fully actuated condition and actuation means for distorting at least a portion of one of the output and input means into the other so that the latter has a distortion which moves therealong in a wave-like fashion between the deactuated and fully actuated conditions whereby the transmission of energy from the input means to the output means is proportional to the amount of distortion.

In correlation with the foregoing objects and features, it is another object and feature of this invention to provide such a coupling assembly wherein the input and output means are circular and concentric.

In correlation with the foregoing objects and features, it is another object and feature of this invention to provide such a coupling assembly wherein bearing means are disposed in the radial space between concentrically spaced input and output means.

In correlation with the foregoing objects and features, it is another object and feature of this invention to provide such a coupling assembly wherein the output means may be movable or stationary so that the assembly acts as a torque convertor when the output emans is movable and as a brake when the output means is stationary or resistive to reverse energy flow when movable.

Other objects and attendant advantages of the present invention will be readily appreciated as the same becomes better understood by reference to the following detailed description when considered in connection with the accompanying drawings wherein.

Figure 1:
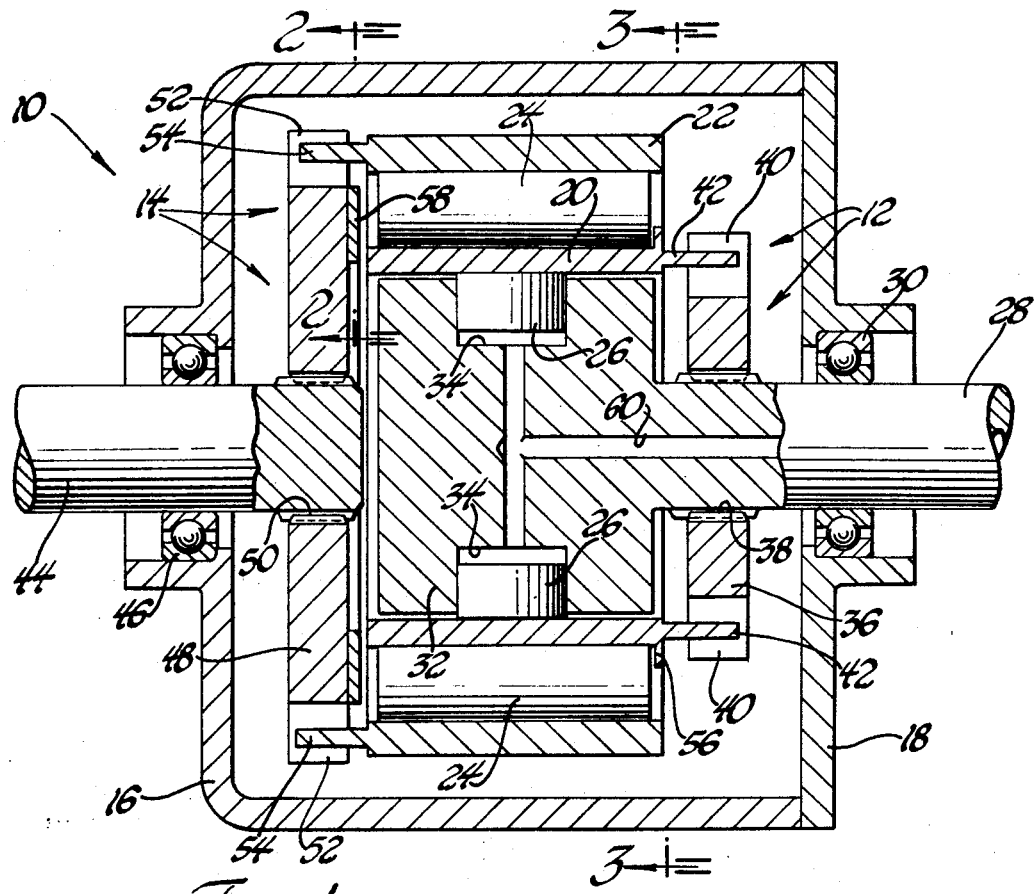
FIG. 1 is a fragmentary cross sectional view of a preferred embodiment of the instant invention shown in conceptual or schematic form.
Figure 2:
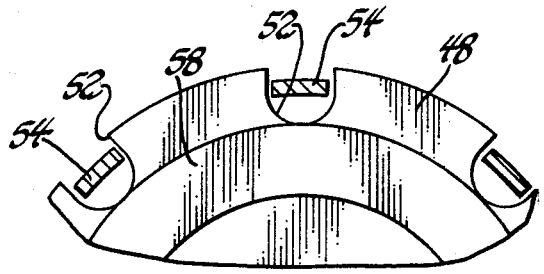
FIG. 2 is a fragmentary cross sectional view taken substantially along line 2—2 of FIG. 1.

The drawings illustrate, in conceptual or schematic form, an exemplary embodiment of the instant invention. A coupling assembly constructed in accordance with the instant invention is generally shown at 10.

The coupling assembly 10 includes a movable input means generally indicated at 12 and an output means generally indicated at 14. The assembly 10 also includes a housing comprising the cup-shaped member 16 and the cover member 18.

The input means 12 includes the cylindrical input member 20 and the output means 14 includes the cylindrical output member 22. The members 20 and 22 are concentric about an axis at rotation.

The assembly 10 also includes bearing means comprising the cylindrical rolling elements 24 disposed between the cylindrical input member 20 and the cylindrical output member 22 for normally allowing relative rotational movement between the cylindrical members 20 and 22.

The assembly 10 also includes actuation means comprising the hydraulically actuated pistons 26 for distorting at least one of the cylindrical members 20 and 22 (20 as shown) into the path of movement of the roller elements 24 so as to offset a portion of the path of the roller elements 24 to control relative movement between the cylindrical members 20 and 22. The input member 20 is freely movable or rotatable relative to the output member 22 during a deactuated, i.e., no distortion condition, and increasingly less movable relative to the output member 22 from the deactuated condition to the fully actuated condition, i.e., maximum distortion condition. The actuation means distorts the cylindrical input member 20 for providing a distortion in the output member 22. The distortion (elliptical as shown) moves along the cylindrical output member 22 in a wave-like fashion. The velocity of the wave-like movement of the distortion in the output member 22 decreases from the deactuated condition to the fully actuated condition so that the transmission of energy from the input member 20 to the output member 22 is proportional to the amount of distortion. As used herein, the term "amount of distortion" means the total distortion resulting from a plurality of distortions or waves or the amplitude of a single distortion or any one of various combinations of the two. If the cylindrical output member 22 is prevented from rotating so that the coupling assembly acts as a brake and the inner cylindrical input member 20 is distorted, there will occur a complementary distortion in the output member 22 and that complementary distortion will move circumferentially around the cylindrical output member 22 as the input member 20 rotates. As the distortion is increased (either in amplitude of a single wave or in the number of waves or both) there is greater resistance to rotation of the input member 20. If the output member 22 is freely rotatable, the input member 20 may be distorted to the extent that the output member 22 rotates at the same velocity or same r.p.m. as the input member 20.

The bearing elements 24 reduce friction between the input and output members 20 and 22, in fact a prototype assembly was built and the output member held stationary as the input member was rotated and no heat as a result of friction could be felt by the human hand. It will be appreciated that instead of utilizing the rolling elements as bearing members, the two members may have bearing surfaces, as for example, plastic surfaces having high lubricity. As will be appreciated, an increase in distortion effects a greater transmission of energy from the input member 20 to the output member 22 so that the transmission of such energy is proportional to the distortion. At the same time, the wave-like movement of the distortion in the output member decreases in velocity circumferentially about the cylindrical output member 22 as the magnitude of the distortion is increased.

The input means 12 includes an input shaft 28 rotatably supported in the housing by the bearing 30 and including the hub portion 32. The pistons 26 are disposed in cylindrical cavities 34 and are diametrically opposed to one another in the hub portion 32. Also included in the input means 12 is the connecting plate or member 36 which is splined to the shaft 28 as indicated at 38 and has a plurality of pockets 40 therein for engaging fingers 42 which extend from the cylindrical input member 20 so that the latter rotates with the shaft 28.

The output means 14 includes a shaft 44 rotatably supported in the housing by a bearing 46. A connector plate or member 48 is splined to the shaft 44 as indicated at 50 and has pockets 52 therein to coact with fingers 54 so that the cylindrical output member 22 rotates with the shaft 44.

The axial movement of the cylindrical element 24 is limited by the circular flange 56 extending radially from the cylindrical input member 20 and the annular shoulder 58 which extends from the face of the connector member 48.

The rolling elements 24 are normally in rolling engagement with the cylindrical members 20 and 22 in the fashion of a roller bearing so as to freely allow relative rotational movement between the cylindrical members 20 and 22.

Figure 3:
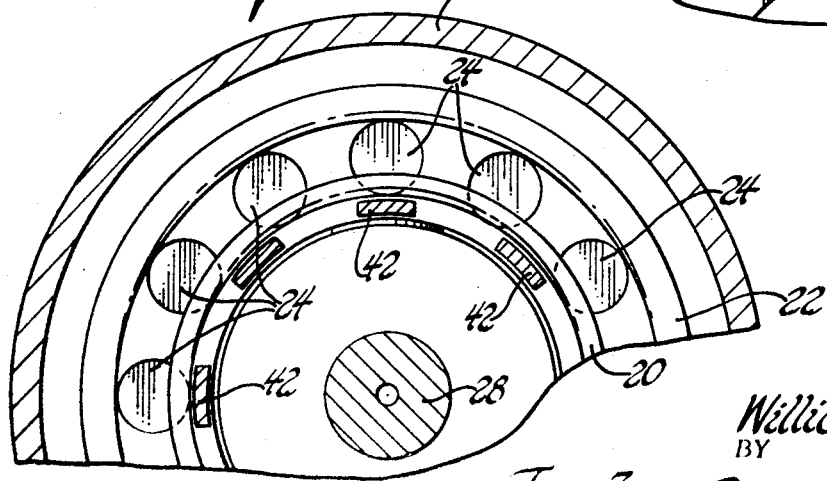
FIG. 3 is a fragmentary cross sectional view taken substantially along line 3—3 of FIG. 1.

In the operation of the system, the input shaft 28 may be rotated to in turn rotate the cylindrical input member 20. In the position illustrated, the input member 20 may rotate freely without rotating the cylindrical reaction member 22. When the assembly is acting as a torque convertor, the shaft 44 is an output shaft and to effect rotation of the output shaft 44, hydraulic pressure is supplied through the line 60 in the shaft 28 to urge the pistons 26 radially outwardly to in turn provide a deformation or distortion in the cylindrical member 20, which distortion moves therealong in a wave-like fashion of decreasing velocity from the deactuated condition to the fully actuated condition so that the transmission of energy from the input member 20 to the output member 22 is proportional to the amount of distortion. In other words, distortion of the cylindrical member 20 will effect a distortion in the cylindrical member 22 and the latter distortion will move in a wave-like fashion about the circumference of the output member whereby the output member 22 will rotate or brake the rotation of the input member 20. The members 20 and 22 are distorted into an elliptical shape as shown in phantom in FIG. 3.

If the inner cylindrical member 20 is distorted only a slight amount, there will be only a small distortion in the cylindrical member 22 and the cylindrical member 22 will rotate at a much slower speed than the input cylindrical member 20 as the distortion moves relatively rapidly around the output member 22. The velocity of the wave-like movement of the distortion about the output member is dependent upon such things as the load, the materials of the components, input r.p.m., etc. As the distortion of the cylindrical member 20 is increased, the distortion in the output member 22 is increased until a point is reached where the distortion does not move in a wavelike fashion about the output member 22 and there is no relative movement between the cylindrical members 20 and 22 and the cylindrical member 22 rotates at the same speed as the input member 20.

This may be explained in another manner. If it is assumed that there is a very high load on the output shaft, the distortions in the output member will be of greater number with lower amplitude or any given distortion will move about the output member at a high frequency as resulting from high speed. It will be appreciated that if the load or negative torque on the output member were decreased, the speed or frequency at which a given distortion moves about the output member would decrease, however, the amplitude would increase. Thus, during high load conditions the distortions are generally of low amplitude and high frequency and the amplitude increases and the frequency decreases as the load on the assembly decreases.

The assembly may also be operated as a brake assembly by maintaining the shaft 44 stationary or resistive. In this situation, as the cylindrical member 20 is distorted, the output member 22 is distorted, but since the output member 22 is held stationary or resists movement, a braking or dragging action is applied to the cylindrical member 22 as the distortion moves in a wavelike fashion about the output member 22 thereby effecting a brake assembly. As will be appreciated, the distortion in output member 22 results in stresses in the output member 22 and these stresses move in the wavelike fashion about the output member 22 until both members 20 and 22 rotate together as the stresses do not move about the output member 22.

As will be appreciated by those skilled in the art, there are various forms which the invention may take other than that which is illustrated and described in conceptual and schematic form herein. It is clear that distortion of the two relatively movable members may take many forms other than the elliptical form described. Additionally, the relatively movable members need not necessarily be concentric cylindrical members. The bearing means need not necessarily take the form of cylindrical rolling elements as described. Various different devices, components and sub-assemblies may be utilized as the actuation means to effect the distortion of the cylindrical members.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A coupling assembly comprising: output means, input means freely movable relative to said output means in a deactuated condition and non-movable relative to said output means in a fully actuated condition, and actuation means for variably distorting a portion of one of said output and input means into the other so that the latter has a distortion which moves there-along in wave-like fashion between said deactuated and actuated conditions whereby the transmission of energy from said input means to said output means is proportional to the amount of said distortion in said output means.

2. A coupling assembly comprising: output means, input means freely movable relative to said output means during a deactuated condition and increasingly less movable relative to said output means between said deactuated condition and a fully actuated condition, and actuation means to variably distort said output and input means for providing a distortion in said output means which moves therealong in wave-like fashion of decreasing velcoity from said deactuated condition to said actuated condition so that transmission of energy from said input means to said output means is proportional to said distortion in said output means.

3. An assembly as set forth in claim 2 including bearing means disposed between said input and output means.

4. An assembly as set forth in claim 3 wherein said bearing means includes at least one rolling element in engagement with said input and output means.

5. An assembly as set forth in claim 4 including a plurality of said rolling elements with each rolling element being cylindrical in configuration.

6. An assembly as set forth in claim 2 wherein said input means and said output means are circular and condentric about an axis and said input means is rotatable about said axis.

7. An assembly as set forth in claim 6 wherein said output means is rotatable about said axis.

8. An assembly as set forth in claim 6 wherein said output means is fixed and non-rotatable about said axis.

9. An assembly as set forth in claim 6 wherein said input and output means are radially spaced.

10. An assembly as set forth in claim 9 including bearing means in the radial space between said input and output means 11. An assembly as set forth in claim 10 wherein said bearing means includes a plruality of rolling elements in engagement with said input and output means.

12. An assembly as set forth in claim 6 wherein said actuation means applies a radial force to one of said input and output means for radially distorting same.

13. An assembly as set forth in claim 7 including an output shaft operatively connected to said output means for rotation therewith, and an input shaft operatively connected to said input member for rotating the latter.

14. An assembly as set forth in claim 13 including a housing rotatably supporting said shafts.

15. A coupling assembly comprising; movable input means, output means, bearings means disposed between said input and output means normally allowing relative movement therebetween, and actuation means for variably distorting one of said input and output means into the other to offset at least a portion of the path of said bearing means to effect a distortion in said output means to control said relative movement between said input and output means.

* * * * *